(12) United States Patent
Özdemir

(10) Patent No.: US 8,064,693 B2
(45) Date of Patent: Nov. 22, 2011

(54) METHODS OF AND APPARATUS FOR ADJUSTING COLOUR SATURATION IN AN INPUT IMAGE

(75) Inventor: Hüseyin Özdemir, Istanbul (TR)

(73) Assignee: Vestel Elektronik Sanayi Ve Ticaret A.S. (TK)

( * ) Notice: Subject to any disclaimer, the term of this patent is extended or adjusted under 35 U.S.C. 154(b) by 1119 days.

(21) Appl. No.: 11/846,881

(22) Filed: Aug. 29, 2007

(65) Prior Publication Data

US 2008/0080784 A1     Apr. 3, 2008

Related U.S. Application Data

(60) Provisional application No. 60/824,168, filed on Aug. 31, 2006.

(51) Int. Cl.
*G06K 9/00*     (2006.01)

(52) U.S. Cl. .......................... 382/167; 382/162

(58) Field of Classification Search .................. 382/162, 382/167; 358/520, 521, 518, 538, 1.19; 348/603
See application file for complete search history.

(56) References Cited

U.S. PATENT DOCUMENTS

| | | | |
|---|---|---|---|
| 4,721,951 A * | 1/1988 | Holler | 358/520 |
| 5,390,034 A | 2/1995 | Murakami | |
| 6,272,239 B1 * | 8/2001 | Colla et al. | 382/167 |
| 2002/0080379 A1 | 6/2002 | Iwaki | |
| 2005/0047657 A1 | 3/2005 | Lee | |

OTHER PUBLICATIONS

European Search Report for Application No. 06254548.8-2202, dated Feb. 6, 2007, 2 pages.

* cited by examiner

*Primary Examiner* — Duy M Dang
(74) *Attorney, Agent, or Firm* — Conley Rose, P.C.

(57) ABSTRACT

A color saturation value for at least some of the pixels in an input image is adjusted to provide an output image. In one aspect, for each pixel for which the color saturation value is adjusted, the color saturation value for the pixel is adjusted in dependence on both a brightness value and a color saturation value for said pixel. In another aspect, the adjusting is carried out by, for each of the at least some pixels, reading from a brightness values look-up table a brightness scale parameter corresponding to the brightness value of the pixel, reading from a color values look-up table a color scale parameter corresponding to the color value of the pixel, obtaining a final scale parameter for the pixel from the brightness scale parameter and the color scale parameter, and adjusting the color value for the pixel in accordance with said final scale parameter.

26 Claims, 6 Drawing Sheets

METHODS OF AND APPARATUS FOR ADJUSTING COLOUR SATURATION IN AN INPUT IMAGE

CROSS-REFERENCE TO RELATED APPLICATIONS

This application claims the benefit of priority to U.S. application Ser. No. 60/824,168 filed Aug. 31, 2006, the content of which is hereby incorporated by reference in its entirety for all purposes.

FIELD OF INVENTION

The inventions relate to methods of and apparatus for adjusting colour saturation in an input image.

BACKGROUND

US-A-2005/0047657 discloses a method and apparatus for adjusting colour saturation in an image, the apparatus being shown schematically in FIG. 1 and using the HSV colour model. The colour saturation adjusting apparatus 100 of this prior art has an RGB-HSV conversion unit 110 which converts RGB values of the input RGB image signal into corresponding HSV values. A colour saturation adjusting function setting unit 120 allows a user to adjust the degree of colour saturation by inputting colour saturation adjusting values for specific hues (i.e. colours) through a colour saturation adjusting menu. It is not practical for the user to input the colour saturation values for all of the hues. Therefore, practically, the user inputs the colour saturation adjusting values for some representative hues (such as red, green, blue, yellow, cyan, and magenta) and the adjustment values for other, intermediate values are obtained by an interpolation method such as a linear interpolation. A colour saturation adjusting unit 130 then provides the colour saturation adjusting value gain corresponding to the H values and new colour saturation values OUT_S are calculated by applying the colour saturation adjusting function to the original colour saturation value S while the H and V values are fixed. The H, OUT_S, and V values obtained by adjusting the original colour saturation values S in the colour saturation adjusting unit 130 are converted into new RGB values in the HSV-RGB conversion unit 140, which outputs the new RGB values.

A problem with this prior art method is that the user inputs gain values for some representative hues only, and then the system determines the gain values for the remaining hues using a linear interpolation function. Moreover, once the gain value for a hue is set, it is used for every pixel of each video frame. In other words, the colour saturation values of each pixel are adjusted with the same gain values. The method is not adaptive to changing illumination conditions. This can lead to artificial and disturbing results in image regions with high luminance and image regions with high colour saturation.

BRIEF SUMMARY

According to a first aspect of the invention, there is provided a method of adjusting colour saturation in an input image to provide an output image, the method comprising:
adjusting a colour saturation value for at least some of the pixels in an input image to provide an output image;
wherein for each pixel for which the colour saturation value is adjusted, the colour saturation value for the pixel is adjusted in dependence on both a brightness value and a colour value for said pixel.

Considering the properties of the human visual system, in general the perceived image contrast of an image depends on two parameters, luminance-based contrast and colour-based contrast. Adjusting the pixel colour saturation values properly using brightness information in addition to colour information for the individual pixels, as in the preferred embodiment of the present invention, increases the perceived image contrast and image details are enhanced. In the preferred embodiment, the colour saturation adjusting values for each pixel are calculated adaptively and separately using the brightness (e.g. luminance) and colour (e.g. chrominance) values of the corresponding pixel.

The colour saturation values for the different pixels may be (and, indeed, in practice will be) adjusted by different amounts in an embodiment of a method of the present invention. In practice, the colour saturation values for some pixels may be increased whereas the colour saturation values for other pixels in the same image or video frame may be decreased. This is in contrast to prior art methods, including that of US-A-2005/0047657 discussed above, in which the colour values for the pixels are all changed by the same amount or factor.

In a preferred embodiment, the method comprises, for each of said at least some pixels, reading from a brightness values look-up table a brightness scale parameter corresponding to the brightness value of the pixel, reading from a colour values look-up table a colour scale parameter corresponding to the colour saturation value of the pixel, obtaining a final scale parameter for the pixel from the brightness scale parameter and the colour scale parameter, and adjusting the colour saturation value for the pixel in accordance with said final scale parameter.

The look-up tables of this embodiment play an important part in respect of performance of the method, both in terms of computational efficiency and in achieving the optimal adjustment of the colour saturation values, enabling easy and dynamic control of the degree of adjustment of the colour saturation values.

In an embodiment, the brightness scale parameters in the brightness values look-up table are a function of the brightness values of pixels. In an embodiment, the colour scale parameters in the colour values look-up table are a function of the colour saturation values of pixels.

The functions used to obtain the brightness scale parameters and the colour scale parameters can in general be any suitable function, such as a linear function. However, good results are obtained by an appropriate trigonometric function for one or both.

Preferably, the brightness scale parameters in the brightness values look-up table are user-adjustable. Preferably, the colour scale parameters in the colour values look-up table are user-adjustable.

In an embodiment, the brightness scale parameters in the brightness values look-up table are calculated after an enhancement level parameter is input by a user and in dependence on said input enhancement level parameter. In an embodiment, the colour scale parameters in the colour values look-up table are calculated after an enhancement level parameter is input by a user and in dependence on said input enhancement level parameter.

In an embodiment, said final scale parameter for a pixel is the average of the brightness scale parameter and the colour scale parameter for said pixel. Taking the average is mathematically and therefore computationally simple and provides good results. Nevertheless, other ways of combining the brightness scale parameters and the colour scale parameters to obtain the final scale parameters may be used, such as by using a weighted average of the brightness scale parameters and the colour scale parameters.

In an embodiment, the brightness scale parameter has relatively small values at both low and high brightness values and a relatively high value at mid-range brightness values.

In an embodiment, the colour scale parameter has a small value at low colour saturation values, increases to a maximum and then decreases with increasing colour saturation value to be at a very small value at high colour saturation values, said very small value being less than said small value.

These preferred variations for the brightness scale parameter and the colour scale parameter, which may be obtained from the preferred trigonometric functions mentioned briefly above, provide for good overall results.

In one embodiment, for each pixel, the colour saturation values are at least one of Cb (the blue chroma component) and Cr (the red chroma component) and the brightness value is Y (the luma component) in the YCbCr model. Because the YCbCr model directly provides chroma components, the preferred embodiment makes use of this model. Nevertheless, it will be understood that other models that separate brightness and colour may be used. In any event, in general, as is well know, it is possible to convert from one model (such as the RGB model) to another (such as the YCbCr model) very easily.

In an embodiment, the colour saturation value on which the adjustment of the colour saturation value depends is the greater of absolute value of (Cb−128) and absolute value of (Cr−128) for the pixel.

According to a second aspect of the invention, there is provided apparatus for adjusting colour saturation in an input image to provide an output image, the apparatus comprising:

a colour saturation value adjuster arranged to adjust a colour saturation value for at least some of the pixels in an input image to provide an output image; characterized in that:

the colour saturation value adjuster is arranged so that, for each pixel for which the colour saturation value is adjusted, the colour saturation value is adjusted in dependence on both a brightness value and a colour saturation value for said pixel.

According to a third aspect of the present invention, there is provided a method of adjusting colour saturation in an input image to provide an output image, the method comprising:

adjusting a colour value for at least some of the pixels in an input image in dependence on both a brightness value and a colour value for said pixels in the input image to provide an output image;

wherein the adjusting comprises for each of said at least some pixels, reading from a brightness values look-up table a brightness scale parameter corresponding to the brightness value of the pixel, reading from a colour values look-up table a colour scale parameter corresponding to the colour value of the pixel, obtaining a final scale parameter for the pixel from the brightness scale parameter and the colour scale parameter, and adjusting the colour value for the pixel in accordance with said final scale parameter;

wherein the brightness scale parameters in the brightness values look-up table are calculated after an enhancement level parameter is input by a user and in dependence on said input enhancement level parameter; and, wherein the colour scale parameters in the colour values look-up table are calculated after an enhancement level parameter is input by a user and in dependence on said input enhancement level parameter.

The look-up tables of this aspect play an important part in respect of performance of the method, both in terms of computational efficiency and in achieving the optimal adjustment of the colour saturation values, enabling easy and dynamic control of the degree of adjustment of the colour saturation values.

In an embodiment, the brightness scale parameters in the brightness values look-up table are a function of the brightness values of pixels. In an embodiment, the colour scale parameters in the colour values look-up table are a function of the colour saturation values of pixels.

The functions used to obtain the brightness scale parameters and the colour scale parameters can in general be any suitable function, such as a linear function. However, good results are obtained by an appropriate trigonometric function for one or both.

Preferably, the brightness scale parameters in the brightness values look-up table are user-adjustable. Preferably, the colour scale parameters in the colour values look-up table are user-adjustable.

In an embodiment, said final scale parameter for a pixel is the average of the brightness scale parameter and the colour scale parameter for said pixel. Taking the average is mathematically and therefore computationally simple and provides good results. Nevertheless, other ways of combining the brightness scale parameters and the colour scale parameters to obtain the final scale parameters may be used, such as by using a weighted average of the brightness scale parameters and the colour scale parameters.

In an embodiment, the brightness scale parameter has relatively small values at both low and high brightness values and a relatively high value at mid-range brightness values.

In an embodiment, the colour scale parameter has a small value at low colour saturation values, increases to a maximum and then decreases with increasing colour saturation value to be at a very small value at high colour saturation values, said very small value being less than said small value.

These preferred variations for the brightness scale parameter and the colour scale parameter, which may be obtained from the preferred trigonometric functions mentioned briefly above, provide for good overall results.

In one embodiment, for each pixel, the colour saturation values are at least one of Cb (the blue chroma component) and Cr (the red chroma component) and the brightness value is Y (the luma component) in the YCbCr model. Because the YCbCr model directly provides chroma components, the preferred embodiment makes use of this model. Nevertheless, it will be understood that other models that separate brightness and colour may be used. In any event, in general, as is well know, it is possible to convert from one model (such as the RGB model) to another (such as the YCbCr model) very easily.

In an embodiment, the colour saturation value on which the adjustment of the colour saturation value depends is the greater of absolute value of (Cb−128) and absolute value of (Cr−128) for the pixel.

According to a fourth aspect of the invention, there is provided apparatus for adjusting colour saturation in an input image to provide an output image, the apparatus comprising:

a colour value adjuster arranged to adjust a colour value for at least some of the pixels in an input image in dependence on both a brightness value and a colour value for said pixels in the input image to provide an output image;

wherein the apparatus is arranged for each of said at least some pixels to read from a brightness values look-up table a brightness scale parameter corresponding to the brightness value of the pixel, to read from a colour values look-up table a colour scale parameter corresponding to the colour value of the pixel, to obtain a final scale parameter for the pixel from the brightness scale parameter and the colour scale parameter, and to adjust the colour value for the pixel in accordance with said final scale parameter;

the apparatus being arranged so that the brightness scale parameters in the brightness values look-up table are calculated after an enhancement level parameter is input by a user and in dependence on said input enhancement level parameter; and, the apparatus being arranged so that the colour scale parameters in the colour values look-up table are calculated after an enhancement level parameter is input by a user and in dependence on said input enhancement level parameter.

The preferred apparatus and/or methods may be incorporated into any apparatus and/or method that is used to adjust the colour saturation of a digital image, including for example an image processor used in a television set or the like, printers, digital cameras, television broadcast capture cards, digital image processing software which may be used in many applications, etc., etc. The methods described herein may be carried out by appropriate software running on appropriate computer equipment. The software may be embedded in an integrated circuit, the integrated circuit being adapted for performing, or for use in the performance of, the relevant processes. Many of the processing steps may be carried out using software, dedicated hardware (such as ASICs), or a combination.

BRIEF DESCRIPTION OF THE DRAWINGS

Embodiments of the invention will now be described by way of example with reference to the accompanying drawings, in which.

BRIEF DESCRIPTION OF PREFERRED EMBODIMENTS

Figure 1:
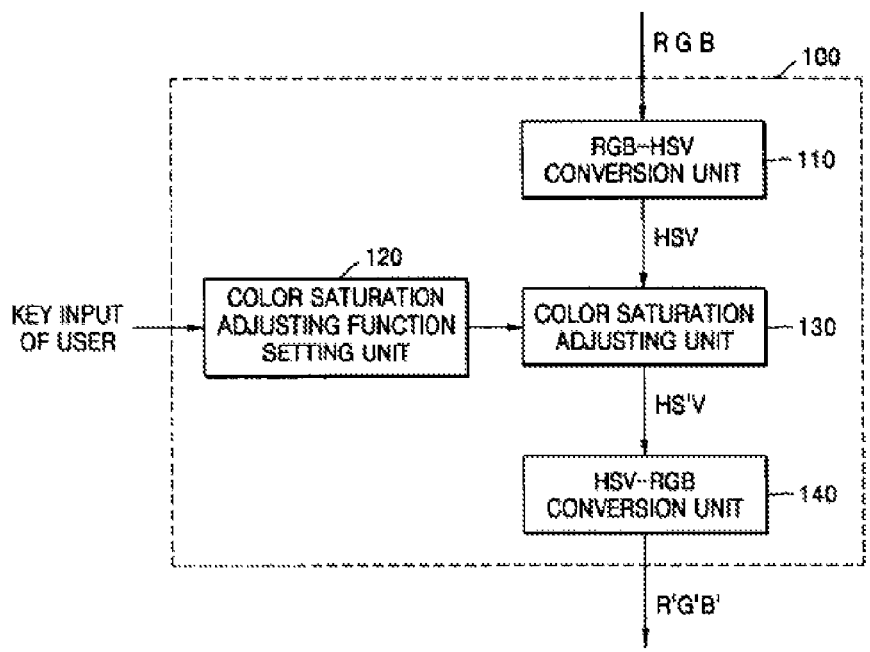
FIG. 1 shows schematically a prior art apparatus.
Figure 2:
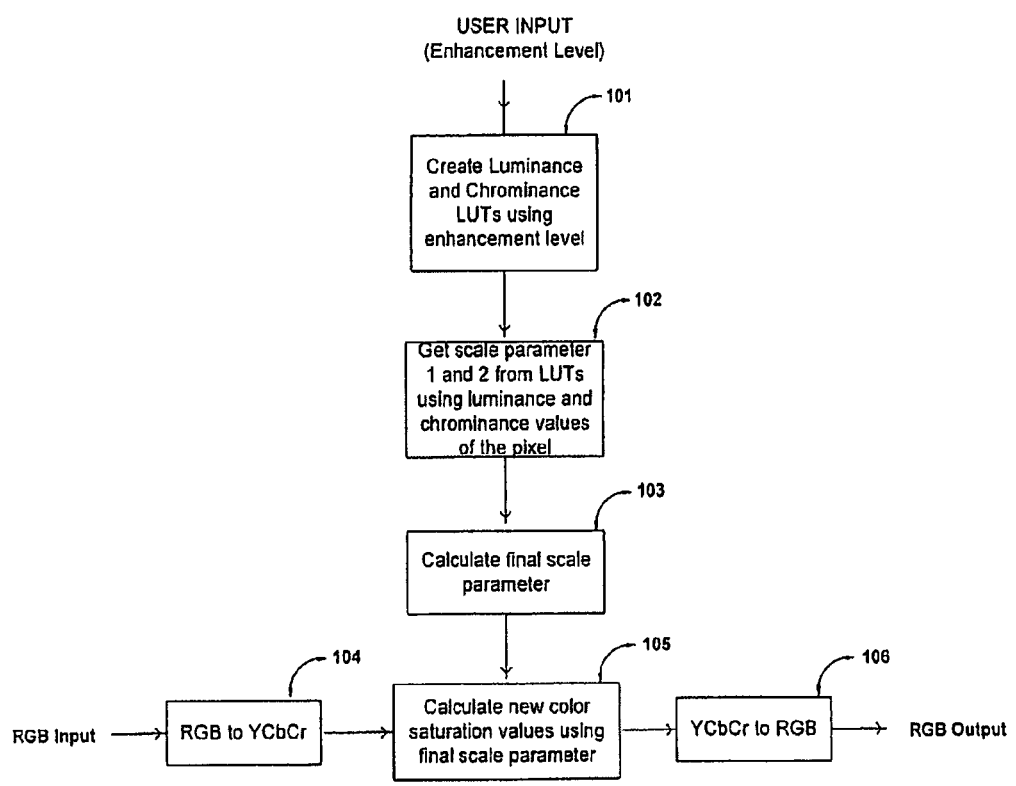
FIG. 2 is a schematic block diagram showing an overview of an example of an embodiment of the invention.

Referring first to FIG. 2, in overview an example of an embodiment of the invention operates as follows. As the first step, the user inputs an enhancement level parameter to the system. The enhancement level parameter determines how mild or how strong the adjustment is. In the preferred embodiment, this is the parameter that determines the data range of look-up tables (LUTs, discussed further below) that are used. As the value of the enhancement level parameter increases, the maximum values in the look-up tables increase and the enhancement is stronger, and vice versa.

In step 101, separate luminance and chrominance LUTs are created using the enhancement level parameter.

In step 102, a first scale parameter 1 ("scaleluma") is read from the luminance LUT using a luminance value (Y) of the pixel being processed. A second scale parameter 2 ("scalechroma") is read from the chrominance LUT using chrominance values (Cb and Cr) of the pixel.

In step 103, a final scale parameter is calculated using the scaleluma and scalechroma parameters which are read from the luminance and chrominance LUTs in step 102. This final scale parameter is used to adjust the colour saturation values of the pixel.

In step 104, RGB values of the input image are converted to YCbCr values in a manner that may be known per se. Since luminance (Y) and chrominance (Cb and Cr) values are separate in the YCbCr colour model, this preferred embodiment directly relates to the YCbCr colour model. Nevertheless, it will be understood that the present invention can be applied in cases where different colour models are used, provided that a brightness value and a colour value are available for each pixel, with appropriate conversion between colour models being carried out as necessary.

In step 105, new colour saturation values are calculated for at least some of the pixels, preferably a majority of the pixels, and most preferably for each pixel, in any case using the original colour saturation values of the pixel and the final scale parameter. The new colour saturation values are checked for overflow and underflow situations. If underflow or overflow occurs, the scale parameter is calculated again to prevent a hue change. The colour saturation values are calculated again using new scale parameter.

In step 106, YCbCr values of the output image are converted to RGB values.

Figure 3:
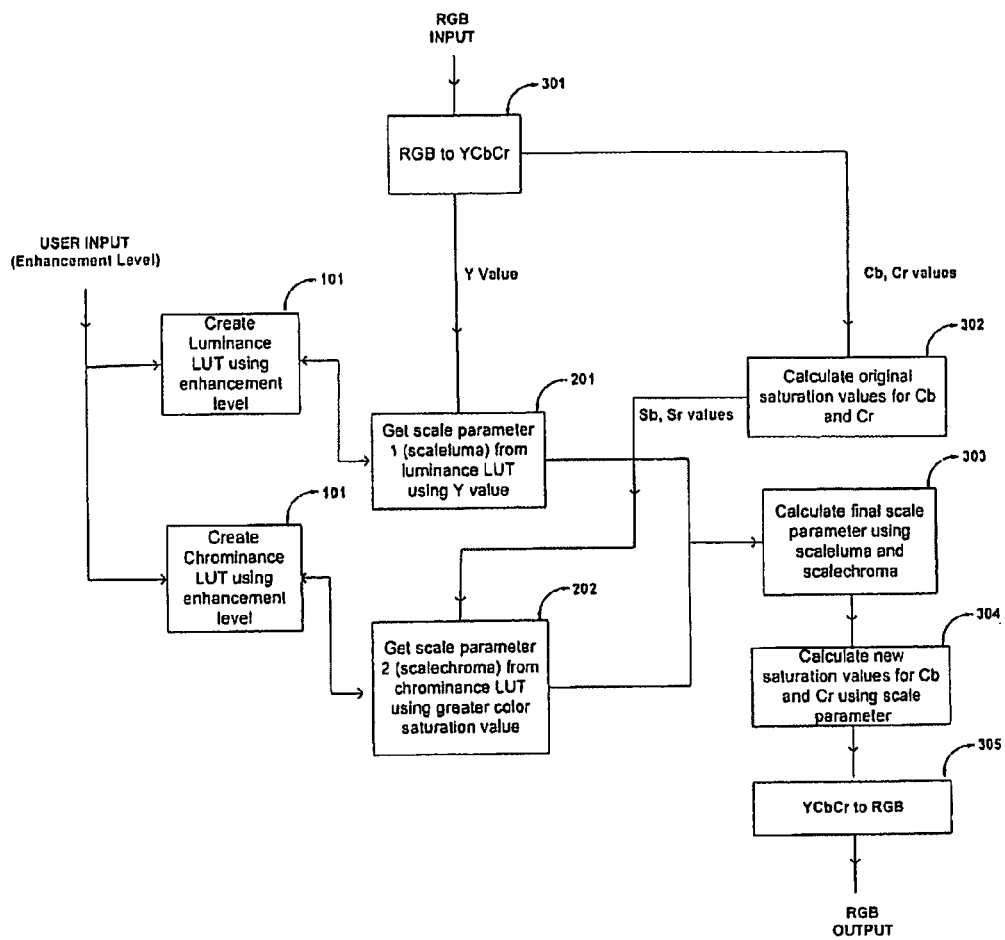
FIG. 3 is a schematic block diagram showing an example of an embodiment of the invention in more detail.

Referring now to FIG. 3, in more detail, the example of FIG. 2 operates as follows. The user inputs the enhancement level parameter to the system, using for example a button on the display system concerned (e.g. on a television set, or a monitor of a computer in which the method is implemented, or the like) or a remote control, etc. This parameter depends on the user preference and determines the data range of the two look-up tables (LUTs). This parameter determines how mild or how strong the adjustment is. As the value of the enhancement level parameter increases, maximum values in the look-up tables increase and the colour saturation adjustment is stronger, and vice versa. In one embodiment, the enhancement level parameter has a value in a range of 0 to 2. When the value of the enhancement level parameter is 0, the original colour saturation values are preserved. In the following discussion for the purposes of illustration, according to an exemplary embodiment of one implementation of the system, the value of the enhancement level parameter is 0.8.

The next step is to create the look-up tables (LUTs) for luminance and chrominance values. These two LUTs are very important for the performance of the system as they are responsible for the increased image contrast. These LUTs are used to store the scaleluma and scalechroma parameters corresponding to every luminance and chrominance value. The LUTs can be created by a number of different methods, for example using linear or trigonometric functions. It has been found that, in general, trigonometric functions give better results. In one exemplary embodiment of the system, the LUTs can be created using the functions below.

In step 101, the luminance LUT is created. An example of an appropriate C code is:

```
for (int Y=0; Y <= 255; Y++) {
    lumalut[Y] = 1+csat*sin(Y*pi/255);
}
```

In step 101, the chrominance LUT is also created. An example of an appropriate C code is:

```
for (int Y=0; Y <= 127; Y++) {
    chromalut[Y] = 1+csat*sin(Y*pi/86);
}
```

In each case, "csat" denotes the enhancement level parameter as set by the user, "Y" denotes pixel luminance and "S" denotes pixel colour saturation. There are two S values for one pixel, Sb and Sr, where Sb=abs(Cb−128) and Sr=abs(Cr−128). In order to reduce the risk of overflow and underflow, as will be seen below, the greater of the Sb, Sr pair is used while accessing the chrominance LUT.

In this embodiment of the system, 8-bit registers are used to store Y, Cb and Cr values. Accordingly, Y, Cb and Cr values are in a range of 0 to 255 and S value is in a range of 0 to 127 in unsigned notation. (When an integer is declared as unsigned, this means that the most significant bit is taken as significant data rather than a sign.)

Figure 4:
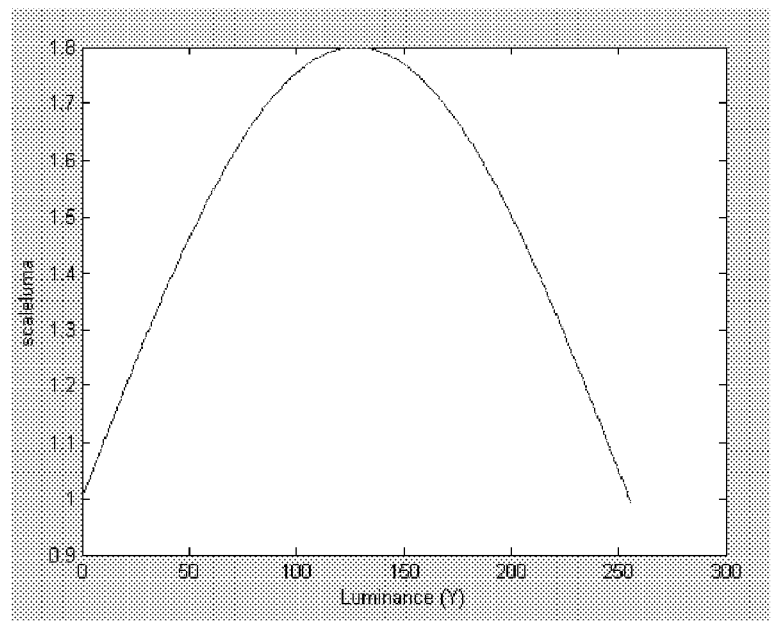
FIGS. 4 and 5 respectively show examples of variation of brightness and colour scale parameters with brightness and colour value respectively; and, FIGS. 6 and 7 respectively show a perspective view and a slice of the final scale parameter and its variation with both brightness and colour value.
Figure 5:
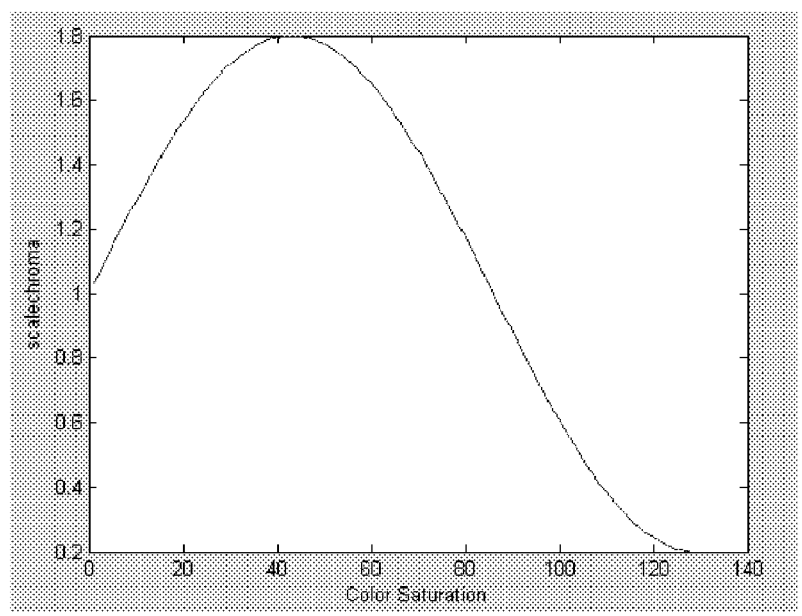

The resulting luminance LUT graph for csat=0.8 is shown in FIG. 4 and the resulting chrominance LUT graph for csat=0.8 is shown in FIG. 5.

From FIG. 4, it will be seen that scaleluma is reduced as the luminance of the pixel approaches 0 or 255. So, when the luminance is very high or very low, luminance-based contrast dominates colour-based contrast. scaleluma takes its maximum value when the luminance of the pixel is 128.

From FIG. 5, it will be seen that scalechroma initially increases as the colour saturation value (the greater of the Sb, Sr pair) increases from 0. scalechroma then decreases as the colour saturation value increases above about 45 and scalechroma drops below 1 as the colour saturation value exceeds 86.

Returning to FIG. 3, in step 301, RGB values of the pixels of the input image are converted to corresponding YCbCr values using the equations below:

$$Y=0.257R+0.504G+0.098B+16$$

$$Cb=-0.148R-0.291G+0.439B+128$$

$$Cr=0.439R-0.368G-0.071B+128$$

It will be understood that these equations are relevant when converting an original image that is in RGB format to the YCbCr model and that other, similar equations may be used if the original image is in a format other than RGB and/or if it is desired to convert to a model other than the YCbCr model.

In step 201, the scaleluma parameter is read from the luminance LUT using the luminance value of the pixel being processed. An example of an appropriate C code is:

$$scaleluma=lumalut[Y[r][c]];$$

where [r] [c] denotes row and column coordinates of the pixel in the image.

In step 302, first the colour saturation values Sb, Sr are calculated for both of the chrominance components Cb, Cr of the pixel being processed. An example of an appropriate C code is:

$$Sb=abs(Cb[r][c]-128);$$

$$Sr=abs(Cr[r][c]-128);$$

As mentioned above, the greater of these colour saturation values is used to access the chrominance LUT in order to prevent or minimize the risk of overflow and underflow. Thus, in step 202, a comparison is made between the colour saturation values of the pixel being processed to find the greater colour saturation value. An example of an appropriate C code is:

```
if (Sb>Sr) {
    scalechroma=chromalut[Sb];
}
else
{
    scalechroma=chromalut[Sr];
}
```

Then, still in step 202, the scalechroma parameter for the pixel being processed is read from the chrominance LUT using the greater of the colour saturation values Sb and Sr.

In step 303, the final "scale" parameter for the pixel being processed is calculated using the scaleluma and scalechroma parameters. In one embodiment, these two parameters can be simply averaged to calculate the final "scale" parameter, i.e.

$$scale=(scaleluma+scalechroma)/2.$$

It will be understood that a different method can be used to obtain the final scale parameter. For example, non-linear functions may be used to add the scaleluma and scalechroma parameters in a non-linear or a weighted manner.

In short, if the value of the final scale parameter is greater than one, then colour saturation values of the pixel being processed are increased. If the value of the final scale parameter is less than one, then colour saturation values of the pixel being processed are decreased.

Figure 6:
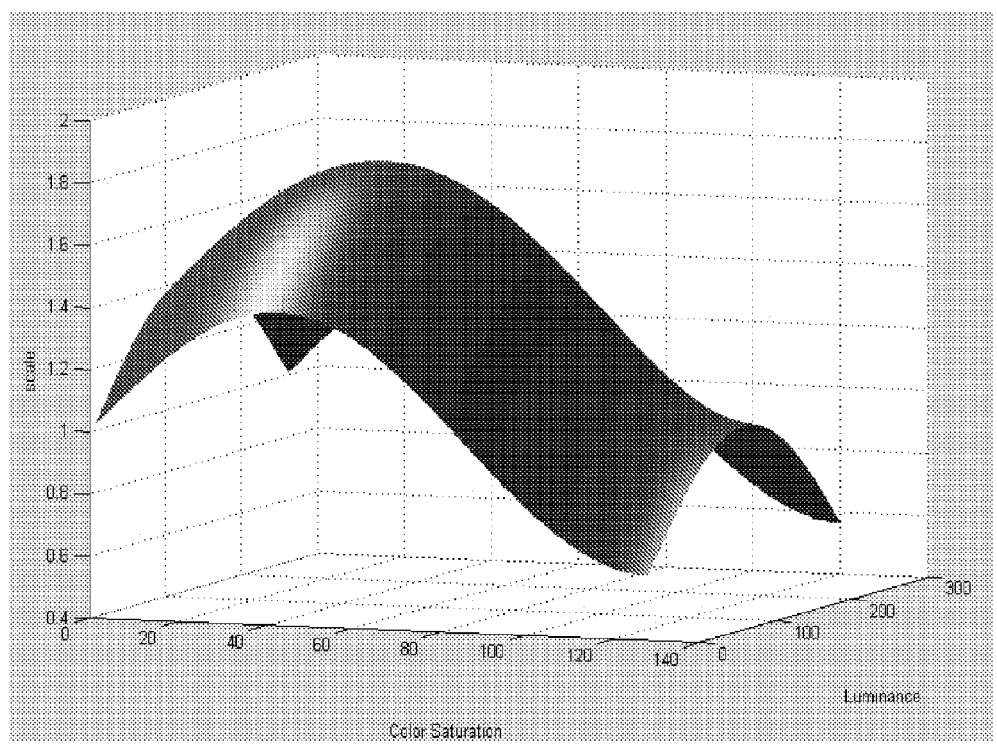
Figure 7:
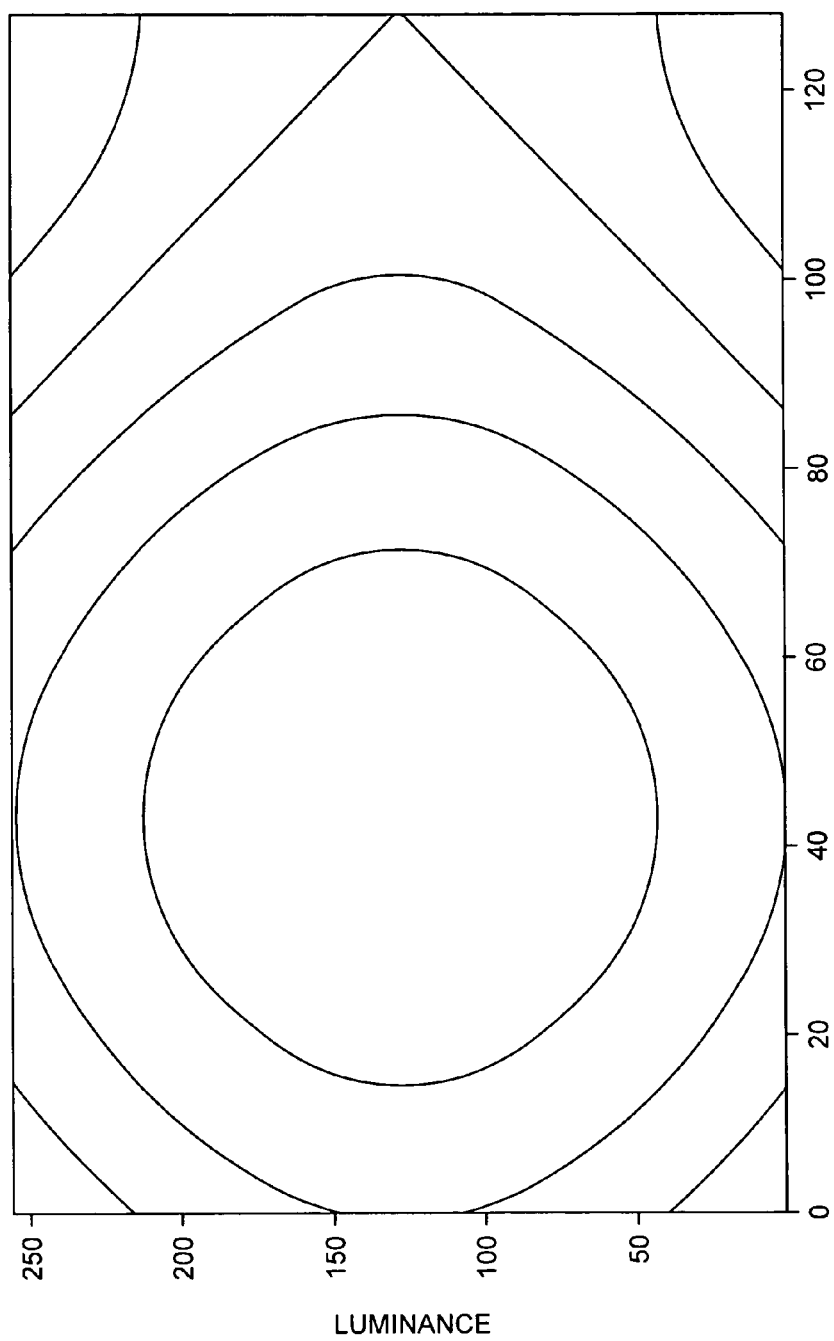

FIG. 6 shows the resulting surface graph for the scale parameter for the case where csat=0.8 and FIG. 7 shows the corresponding contour map. As can be seen, in this example if the original colour saturation value is less than 86, then the colour saturation value is increased by an amount that depends on the value of scaleluma. If the original colour saturation value is greater than 86, then the colour saturation value is decreased or increased depending on the value of scaleluma because the value of the final scale parameter depends on both scaleluma and scalechroma, in either case the amount of increase or decrease varying accordingly. FIG. 7 shows quite clearly the regions where the scale parameter is greater than one and the regions where scale parameter is less than one. In particular, the triangles on the right side of the black lines are saturation-decreasing regions as the scale parameter is less than "1" in these triangular regions. If the colour saturation and luminance values of a pixel fit one of these triangular regions, then the colour saturation values for that pixel are decreased to increase the perceived image contrast.

Returning to FIG. 3, in step 304 new colour saturation values are calculated for both color components of the pixel as follows:

$$Cbb[r][c]=128+(Cb[r][c]-128)*scale;$$

$$Crr[r][c]=128+(Cr[r][c]-128)*scale;$$

where Cbb[r][c] is the new value of Cb[r][c] and Crr[r][c] is the new value of Cr[r][c].

After calculating the new colour saturation values, a check is made whether overflow or underflow has occurred. If so, then the new colour saturation value is accepted as 0 or 255 in underflow or overflow conditions respectively, the scale parameter is calculated again, and the new scale parameter is used to adjust the Cbb and Crr values to prevent hue change.

In step 305, YCbCr values of the enhanced image are converted to RGB values using the equations below:

$$R' = 1.164(Y-16) + 1.596(Cr-128)$$

$$G' = 1.164(Y-16) - 0.813(Cr-128) - 0.392(Cb-128)$$

$$B' = 1.164(Y-16) + 2.017(Cb-128)$$

to find the modified RGB values R', G' and B' for the pixel in the enhanced image in RGB format.

This process is carried out on other pixels of the input image, preferably is carried out on a majority of the pixels in the input image, and, most preferably, is carried out on all pixels of the input image.

In summary, a preferred embodiment uses separate saturation gain parameters for each pixel taking into account the luminance and saturation values of the pixels. By calculating separate parameters, a preferred embodiment can provide colour saturation or desaturation for separate pixels of a picture depending on their brightness (luminance in the example above) and colour (chrominance in the example above), which not only provides an effective colour saturation but also creates a local contrast enhancement effect. The preferred algorithms to obtain the look-up tables decreases computational complexity and provides effective real-time performance.

Embodiments of the invention have been described with particular reference to the examples illustrated. However, it will be appreciated that variations and modifications may be made to the examples described within the scope of the inventions.

The invention claimed is:

1. A method of adjusting colour saturation in an input image to provide an output image, the method comprising:
    Adjusting, by a processor, a colour saturation value for at least some of the pixels in an input image to provide an output image;
    wherein for each pixel for which the colour saturation value is adjusted, the colour saturation value for the pixel is adjusted in dependence on both a brightness value and a colour value for said pixel;
    for each of said at least some pixels, reading from a brightness values look-up table a brightness scale parameter corresponding to the brightness value of the pixel, reading from a colour values look-up table a colour scale parameter corresponding to the colour value of the pixel, obtaining a final scale parameter for the pixel from the brightness scale parameter and the colour scale parameter, and adjusting the colour saturation value for the pixel in accordance with said final scale parameter; and,
    receiving, by a processor, an enhancement level parameter input by a user, wherein the brightness scale parameters in the brightness values look-up table are calculated in dependence on said input enhancement level parameter.

2. A method according to claim 1, wherein the brightness scale parameters in the brightness values look-up table are a function of the brightness values of pixels.

3. A method according to claim 2, wherein the function of the brightness values is a trigonometric function.

4. A method according to claim 1, wherein the brightness scale parameters in the brightness values look-up table are user-adjustable.

5. A method according to claim 1, wherein the colour scale parameters in the colour values look-up table are a function of the colour values of pixels.

6. A method according to claim 5, wherein the function of the colour values is a trigonometric function.

7. A method according to claim 1, wherein the colour scale parameters in the colour values look-up table are user-adjustable.

8. A method according to claim 1, wherein the colour scale parameters in the colour values look-up table are calculated after an enhancement level parameter is input by a user and in dependence on said input enhancement level parameter.

9. A method according to claim 1, comprising finding an average of the brightness scale parameter and the colour scale parameter for said pixel and setting the final scale parameter to be said average.

10. A method according to claim 1, wherein the brightness scale parameter has relatively small values at both low and high brightness values and a relatively high value at mid-range brightness values.

11. A method according to claim 1, wherein the colour scale parameter has a small value at low colour values, increases to a maximum and then decreases with increasing colour value to be at a very small value at high colour values, said very small value being less than said small value.

12. A method according to claim 1, wherein for each pixel, the colour values are at least one of Cb (the blue chroma component) and Cr (the red chroma component) and the brightness value is Y (the luma component) in the YCbCr model.

13. A method according to claim 12, wherein the colour value on which the adjustment of the colour saturation value depends is the greater of absolute value of (Cb-128) and absolute value of (Cr-128) for the pixel.

14. Apparatus for adjusting colour saturation in an input image to provide an output image, the apparatus comprising:
    a non-transitory computer readable medium storing a colour saturation value adjuster arranged to adjust a colour saturation value for at least some of the pixels in an input image to provide an output image; wherein:
    the colour saturation value adjuster is arranged so that, for each pixel for which the colour saturation value is adjusted, the colour saturation value is adjusted in dependence on both a brightness value and a colour value for said pixel,
    wherein the apparatus is arranged for each of said at least some pixels to read from a brightness values look-up table a brightness scale parameter corresponding to the brightness value of the pixel, to read from a colour values look-up table a colour scale parameter corresponding to the colour value of the pixel, to obtain a final scale parameter for the pixel from the brightness scale parameter and the colour scale parameter, and to adjust the colour saturation value for the pixel in accordance with said final scale parameter,
    wherein the apparatus is arranged to receive an enhancement level parameter input by a user and so that the brightness scale parameters in the brightness values look-up table are calculated in dependence on said input enhancement level parameter.

15. Apparatus according to claim 14, wherein the brightness scale parameters in the brightness values look-up table are a function of the brightness values of pixels.

16. Apparatus according to claim 15, wherein the function of the brightness values is a trigonometric function.

17. Apparatus according to claim 14, wherein the brightness scale parameters in the brightness values look-up table are user-adjustable.

18. Apparatus according to claim 14, wherein the colour scale parameters in the colour values look-up table are a function of the colour values of pixels.

19. Apparatus according to claim 18, wherein the function of the colour values is a trigonometric function.

20. Apparatus according to claim 14, wherein the colour scale parameters in the colour values look-up table are user-adjustable.

21. Apparatus according to claim 14, the apparatus being arranged to receive an enhancement level parameter input by a user and so that the colour scale parameters in the colour values look-up table are calculated in dependence on said input enhancement level parameter.

22. Apparatus according to claim 14, comprising finding an average of brightness scale parameter and the colour scale parameter for said pixel and setting the final scale parameter to be said average.

23. Apparatus according to claim 14, wherein the brightness scale parameter has relatively small values at both low and high brightness values and a relatively high value at mid-range brightness values.

24. Apparatus according to claim 14, wherein the colour scale parameter has a small value at low colour values, increases to a maximum and then decreases with increasing colour value to be at a very small value at high colour values, said very small value being less than said small value.

25. Apparatus according to claim 14, wherein for each pixel, the colour values are at least one of Cb (the blue chroma component) and Cr (the red chroma component) and the brightness value is Y (the luma component) in the YCbCr model.

26. Apparatus according to claim 25, wherein the colour value on which the adjustment of the colour saturation value depends is the greater of absolute value of (Cb-128) and absolute value of (Cr-128) for the pixel.

* * * * *